(No Model.)

J. WALTER.
THREAD GUIDE AND CUTTER.

No. 534,535. Patented Feb. 19, 1895.

WITNESSES:

INVENTOR
J. Walter
BY
ATTORNEYS.

UNITED STATES PATENT OFFICE.

JOSEPH WALTER, OF BROOKLYN, NEW YORK.

THREAD GUIDE AND CUTTER.

SPECIFICATION forming part of Letters Patent No. 534,535, dated February 19, 1895.

Application filed November 8, 1894. Serial No. 528,238. (No model.)

*To all whom it may concern:*

Be it known that I, JOSEPH WALTER, of Brooklyn, in the county of Kings and State of New York, have invented a new and Improved Thread Guide and Cutter, of which the following is a full, clear, and exact description.

My invention relates to a device to be attached to a spool, whereby the thread may be removed therefrom in suitable quantities without danger of the thread becoming tangled, or the thread intended to remain upon the spool loosened, and the object of the invention is to provide such a device constructed in a simple and economic manner, the device being capable of ready application to a spool, and of being expeditiously and conveniently removed therefrom.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
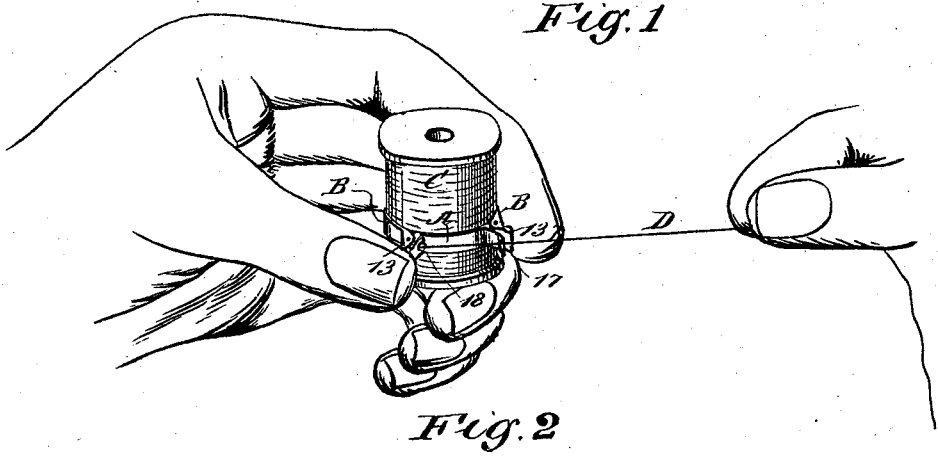
Figure 2:
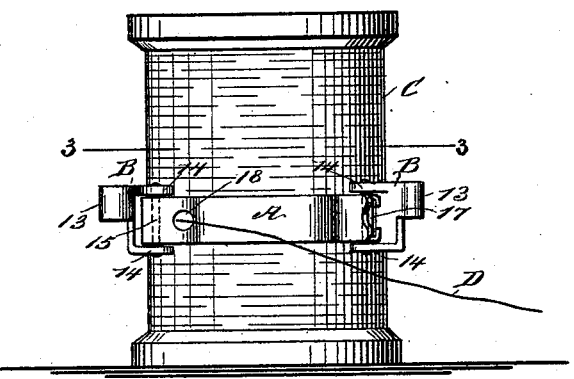
Figure 3:
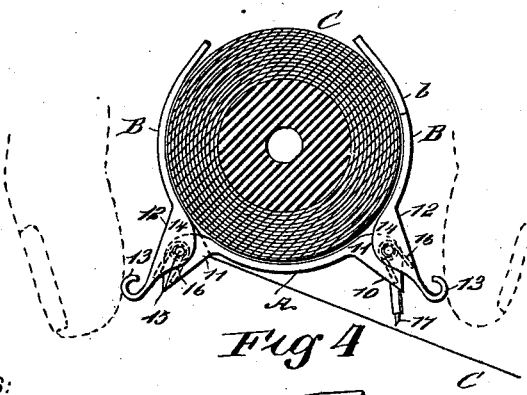

Figure 1 is a perspective view of the device applied to a spool, illustrating the manner in which the thread is drawn through the device. Fig. 2 is a side elevation of the spool and a front elevation of the device attached thereto. Fig. 3 is a section taken horizontally through the spool, practically on the line 3—3 of Fig. 2, showing the device in plan view; and Fig. 4 is a plan view of the device detached from the spool.

In carrying out the invention the device may be said to consist of a body or front section A and two jaws B pivotally connected with the body. The body and jaws are all preferably made from sheet metal, although any suitable material may be employed for the purpose.

Figure 4:
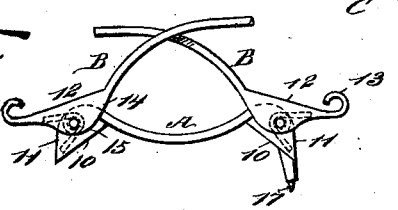

The body or front bar A is concaved upon its inner face and convexed upon its outer face, as shown in Fig. 4, and at each end an extension 10 is made from the outer face, said extension standing at an angle to the body, and each extension is provided at top and bottom with an ear 11. The jaws are likewise curved, being concaved upon their inner and convexed upon their outer faces, and they are adapted to fold one upon the other when not in use, as is also shown in Fig. 4.

Each jaw B at its pivot end is provided with an extension 12 at an angle to its body portion, and each extension terminates at what may be termed its forward end in a handle 13, a finger rest or its equivalent; and the extension 12 of each jaw is provided with an ear 14, at top and bottom, and the ears of the jaws are brought in engagement with the ears of the extensions of the body, and are pivotally connected by pivot pins 15. The jaws are given an inward inclination, or are normally held folded, when removed from the spool by means of springs 16, which are coiled around the pivots 15 and have bearing at one end against the jaw and at the other end against the body or front bar. The jaws at their free ends are cut away or recessed, as shown at *b* in Fig. 3, in order that when the device is removed from the spool the jaws will interlock and be prevented from closing tightly against the body or front bar. The said body or front bar, at one of its ends, preferably near the left-hand end, is provided with an opening 18, as is best shown in Figs. 1 and 2.

In placing the device upon the spool the handles 13 of the jaws are grasped by the finger and thumb of one hand and the jaws are opened, the spool being held between the thumb and fingers of the left hand. The thread is passed out through the opening 18 in the device, and the spool is then passed between the jaws and the jaws released in order to clamp the spool. In placing the device in position upon the spool, the aperture in the body or front bar should be brought to that side of the spool from which the thread unwinds.

In operation the thread is unwound from the spool by holding the device between the thumb and finger of the left hand, as shown in Fig. 1, and drawing upon the thread at its free end by the right hand, whereupon the spool will readily turn between the jaws of the device, and the thread will be thus unwound from the spool. The spool will travel up and down between the jaws according to the position of the strand being unwound.

Upon one extension, preferably the right-hand extension, of the body or front bar, a knife 17 is secured, whereby after drawing a suitable length of thread from the spool the thread may be carried to the knife and cut.

Having thus described my invention, I claim as new and desire to secure by Letters Patent—

1. A thread guide, the same consisting of a body bar having extensions at each end located at an angle to its outer face, and ears formed upon said extensions, and jaws concaved upon their inner faces provided with extensions at one of their ends forming handles, the said extensions having ears made to engage with the ears of the body bar, pivots passing through the opposing ears of the jaws and the body, and springs coiled around said pivots, having bearing at one end against the body and at the opposite end against the jaw, whereby the tendency of the springs is normally to close the jaws, and means, substantially as shown and described, for guiding the thread through the body bar, as and for the purpose specified.

2. A thread guide and cutter, the same consisting of a body bar having an opening and spring-actuated jaws pivotally connected to the ends of the body bar and provided with handles at their pivoted ends, the free ends of the jaws being recessed upon opposite edges, substantially as set forth.

3. A thread guide comprising a curved body portion, provided with an extension projecting from each of its ends at angles to its main portion, and spring-actuated jaws pivoted on the outer surfaces of said extensions with their extremities projecting beyond the same, whereby a handle is formed on each jaw, substantially as set forth.

JOSEPH WALTER.

Witnesses:
 ALBERT WILLERTH,
 W. A. HOLWIG.